United States Patent
Tsuboi et al.

(10) Patent No.: US 12,209,146 B2
(45) Date of Patent: Jan. 28, 2025

(54) MODIFIED CELLULOSE FIBER POWDER

(71) Applicant: KAO CORPORATION, Tokyo (JP)

(72) Inventors: Takuma Tsuboi, Sakai (JP); Takuya Morioka, Wakayama (JP); Junnosuke Saito, Osaka (JP)

(73) Assignee: KAO CORPORATION, Tokyo (JP)

( * ) Notice: Subject to any disclaimer, the term of this patent is extended or adjusted under 35 U.S.C. 154(b) by 778 days.

(21) Appl. No.: 17/311,418

(22) PCT Filed: Dec. 26, 2019

(86) PCT No.: PCT/JP2019/051131
§ 371 (c)(1),
(2) Date: Jun. 7, 2021

(87) PCT Pub. No.: WO2020/138291
PCT Pub. Date: Jul. 2, 2020

(65) Prior Publication Data
US 2022/0025073 A1 Jan. 27, 2022

(30) Foreign Application Priority Data

Dec. 27, 2018 (JP) ................................. 2018-244934

(51) Int. Cl.
*C08B 15/04* (2006.01)
*C08J 3/12* (2006.01)
*C08L 27/06* (2006.01)

(52) U.S. Cl.
CPC ............. *C08B 15/04* (2013.01); *C08J 3/12* (2013.01); *C08L 27/06* (2013.01); *C08J 2301/04* (2013.01); *C08L 2205/16* (2013.01)

(58) Field of Classification Search
CPC .. C08B 15/04; C08B 15/06; C08J 3/12; C08J 2301/04; C08L 27/06; C08L 2205/16; C08L 63/00; C08G 59/686; C08G 59/245
See application file for complete search history.

(56) References Cited

U.S. PATENT DOCUMENTS

| | | | |
|---|---|---|---|
| 2009/0276637 A1 | 11/2009 | Coonan et al. | |
| 2010/0233481 A1* | 9/2010 | Isogai | D21H 11/20 428/401 |
| 2016/0333116 A1 | 11/2016 | Nakatani et al. | |
| 2019/0225712 A1 | 7/2019 | Yamato et al. | |
| 2021/0087713 A1 | 3/2021 | Fukui et al. | |

FOREIGN PATENT DOCUMENTS

| | | |
|---|---|---|
| CN | 104448007 A | 3/2015 |
| CN | 105175557 A | 12/2015 |
| CN | 111511980 A | 8/2020 |
| JP | 2009-242590 A | 10/2009 |
| JP | 2015134873 A * | 7/2015 |
| JP | 2016186018 A * | 10/2016 |
| JP | 2017-2136 A | 1/2017 |
| JP | 2017-52942 A | 3/2017 |
| JP | 2017052942 A * | 3/2017 |
| JP | 2019-151791 A | 9/2019 |
| TW | 201815828 A | 5/2018 |
| WO | WO2018/143150 A1 | 8/2018 |

OTHER PUBLICATIONS

Chinese Office Action for corresponding Chinese Application No. 201980086398.6, dated May 5, 2022.
Beck et al., "Dispersibility in Water of Dried Nanocrystalline Cellulose," Biomacromolecules, vol. 13, No. 5, Apr. 6, 2012, pp. 1486-1494 (6 pages total).
International Search Report for International Application No. PCT/JP2019/051131, dated Mar. 24, 2020.
Extended European Search Report for European Application No. 19901646.0, dated Jul. 22, 2022.

* cited by examiner

*Primary Examiner* — Kumar R Bhushan
(74) *Attorney, Agent, or Firm* — Birch, Stewart, Kolasch & Birch, LLP

(57) ABSTRACT

A powder of modified cellulose fibers has an average fiber length of 1 μm or more and 500 μm or less, wherein the modified cellulose fibers are made from anionically modified cellulose fibers introduced at an anionic group with a modifying group. A dispersion contains a powder of modified cellulose fibers as defined above and a medium, wherein the powder of modified cellulose fibers is dispersed in the medium. A resin composition contains a powder of modified cellulose fibers as defined above and a resin, wherein the powder of modified cellulose fibers and the resin are blended. A resin molded article is obtained by molding a resin composition as defined above. A powder of cellulose fibers having excellent dispersibility in a solvent, which can be obtained by an inexpensive process, and a method for producing the same can be provided.

17 Claims, No Drawings

MODIFIED CELLULOSE FIBER POWDER

FIELD OF THE INVENTION

The present invention relates to a powder of modified cellulose fibers.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in nature in large amounts have been remarked.

Usually, when cellulose fibers are dried, hydrogen bonds are formed between the fibers, thereby undesirably aggregating the cellulose fibers. As a result, it would be difficult to disperse the dried cellulose fibers in a medium such as water or an organic solvent, and it can be said that the dried cellulose fibers are materials that are inconvenient-to-use in this regard.

In order to improve the dispersibility of the dried cellulose fibers, for example, Patent Publication 1 shows that re-dispersibility of anionically modified cellulose nanofibers (CNF) is improved by mixing the CNF with a re-dispersibility improver and drying them. Further, for example, Patent Publication 2 shows that nano-dispersion can be carried out with a solvent in the same manner as one prepared from a non-dried state by treating dry solids of CNF with a hot water, prior to the re-dispersion of the dry solids in a solvent.

Patent Publication 1: WO 2018/143150
Patent Publication 2: Japanese Patent Laid-Open No. 2017-002136

SUMMARY OF THE INVENTION

The present invention relates to the following [1] to [4]:
[1] A powder of modified cellulose fibers having an average fiber length of 1 μm or more and 500 μm or less, wherein the modified cellulose fibers are made from anionically modified cellulose fibers introduced at an anionic group with a modifying group.
[2] A dispersion containing a powder of modified cellulose fibers as defined in the above [1] and a medium, wherein the powder of modified cellulose fibers is dispersed in the medium.
[3] A resin composition containing a powder of modified cellulose fibers as defined in the above [1] and a resin, wherein the powder of modified cellulose fibers and the resin are blended.
[4] A resin molded article obtained by blending a resin composition as defined in the above [3].

In both of Patent Publications 1 and 2, the cellulose fibers are subjected to defibrillation treatment to sizes of nanometers, dried, and re-dispersed in a solvent. Since a large amount of energy is needed in the nano-defibrillation treatment of the cellulose fibers, these techniques inevitably involve expensive processes.

Therefore, the present invention relates to a powder of cellulose fibers having excellent dispersibility in a solvent, which can be obtained by an inexpensive process, and a method for producing the same.

According to the present invention, a powder of cellulose fibers having excellent dispersibility in a solvent, which can be obtained by an inexpensive process, and a method for producing the same can be provided.

DETAILED DESCRIPTION OF THE INVENTION

Powder of Modified Cellulose Fibers

The powder of modified cellulose fibers of the present invention refers to a powder of modified cellulose fibers having an average fiber length of 1 μm or more and 500 μm or less, wherein the modified cellulose fibers are made from anionically modified cellulose fibers introduced at an anionic group with a modifying group.

As a result of studying the above problems, the present inventors have surprisingly found out that a powder of modified cellulose fibers having a specified average fiber length has excellent dispersibility in a solvent or a resin, wherein the modified cellulose fibers are made from anionically modified cellulose fibers introduced at an anionic group with a modifying group. Although the mechanisms are not fully elucidated, it is assumed that hydrogen bonding strengths between the modified cellulose fibers are lowered, thereby possibly improving the dispersibility.

The powder of modified cellulose fibers of the present invention can be produced by producing modified cellulose fibers having an average fiber length of 1 μm or more and 500 μm or less from raw material cellulose fibers, and drying the modified cellulose fibers.

Cellulose Fibers

As the raw material cellulose fibers, it is preferable to use natural cellulose fibers, from the viewpoint of environmental burden. The natural cellulose fibers include, for example, those from wooden pulp such as pulp from needle-leaf trees and pulp from broad-leaf trees; cotton pulp such as cotton linter and cotton lint; non-wooden pulp such as maize straw pulp and bagasse pulp; bacteria cellulose; and the like. These natural cellulose fibers can be used alone or in a combination of two or more kinds.

The average fiber diameter of the raw material cellulose fibers is, but not particularly limited to, preferably 1 μm or more, more preferably 5 μm or more, and even more preferably 15 μm or more, from the viewpoint of handling property and costs, and on the other hand, the average fiber diameter is preferably 300 μm or less, more preferably 100 μm or less, and even more preferably 60 μm or less.

In addition, the average fiber length of the raw material cellulose fibers is, but not particularly limited to, preferably exceeding 1,000 μm, more preferably 1,200 μm or more, and even more preferably 1,500 μm or more, and preferably 10,000 μm or less, more preferably 5,000 μm or less, and even more preferably 3,000 μM or less, from the viewpoint of availability and costs. The average fiber diameter and the average fiber length of the raw material cellulose fibers can be measured in accordance with the methods described in Examples set forth below.

Anionic Group-Containing Anionically Modified Cellulose Fibers

The anionic group-containing anionically modified cellulose fibers (also simply referred to as "anionically modified cellulose fibers") usable in the present invention are cellulose fibers that are anionically modified so that the cellulose fibers contain an anionic group.

The preferred ranges of the average fiber diameter and the average fiber length of the anionically modified cellulose fibers depend upon the orders of the production steps. For example, when the anionically modified cellulose fibers are not subjected to a fiber shortening treatment, the preferred ranges of the average fiber diameter and the average fiber length of the anionically modified cellulose fibers are of the same levels as those of the raw material cellulose fibers. When the anionically modified cellulose fibers are subjected to a fiber shortening treatment, the preferred ranges of the average fiber diameter and the average fiber length of the anionically modified cellulose fibers are of the same levels as those of the fiber-shortened cellulose fibers described later.

The anionically modified cellulose fibers have a content of an anionic group of preferably 0.1 mmol/g or more, more preferably 0.2 mmol/g or more, even more preferably 0.5 mmol/g or more, and even more preferably 0.8 mmol/g or more, from the viewpoint of stable fine pulverization and introduction of modifying group. The upper limit of the content of an anionic group is preferably 3 mmol/g or less, more preferably 2 mmol/g or less, and even more preferably 1.8 mmol/g or less. In order to have the content of an anionic group within the range as mentioned above, the content of an anionic group can be controlled by, for example, adjusting the treatment conditions of oxidization treatment or the like, or carrying out a reducing treatment. The content of an anionic group means a total amount of anionic groups in the cellulose fibers constituting the anionic group-containing cellulose fibers, which is measured in accordance with a method described in Examples set forth below.

The anionic group contained in the anionically modified cellulose fibers includes, for example, a carboxy group, a sulfonate group, a phosphate group, and the like, and the carboxy group is preferred, from the viewpoint of the introduction efficiency to the cellulose fibers.

Step of Introducing Anionic Group

The anionically modified cellulose fibers usable in the present invention can be obtained by subjecting the cellulose fibers to an oxidation treatment or an addition treatment of an anionic group and introducing the cellulose fibers with at least one or more anionic groups, to anionically modify.

The cellulose fibers to be anionically modified include
(1) the raw material cellulose fibers, and
(2) fiber-shortened cellulose fibers obtained by subjecting the raw material cellulose fibers to a fiber shortening treatment.

It is preferable that the cellulose fibers to be anionically modified are the raw material cellulose fibers of (1), from the viewpoint of exhibiting the effects of the present invention.

(i) A Case of Introducing Cellulose Fibers with a Carboxy Group as an Anionic Group The method of introducing the cellulose fibers with a carboxy group as an anionic group includes, for example, a method of oxidizing the cellulose at a hydroxyl group to convert the hydroxyl group to a carboxy group, and a method of treating the cellulose at a hydroxyl group with at least one member selected from the group consisting of compounds having a carboxy group, acid anhydrides of the compounds having a carboxy group, and derivatives thereof.

The method of subjecting the above cellulose to an oxidization treatment at a hydroxyl group is not particularly limited. For example, a method of subjecting to an oxidization treatment including treating the cellulose with an oxidizing agent such as sodium hypochlorite and a bromide such as sodium bromide using 2,2,6,6-tetramethyl-1-piperidine-N-oxyl (TEMPO) as a catalyst can be applied. More specifically, a reference can be made to a method described in Japanese Patent Laid-Open No. 2011-140632.

By subjecting the cellulose fibers to an oxidization treatment using TEMPO as a catalyst, a hydroxymethyl group ($—CH_2OH$) at C6 position of the cellulose constituting unit is selectively converted to a carboxy group. In particular, this method is advantageous in the aspects that the selectivity of a hydroxyl group at C6 position to be oxidized on the surface of the raw material cellulose fibers is excellent, and reaction conditions are mild. Therefore, a preferred embodiment of the anionically modified cellulose fibers in the present invention includes cellulose fibers derived from oxidation of TEMPO, i.e. cellulose fibers in which C6 position of the cellulose constituting unit is a carboxy group. The cellulose fibers as used herein may be referred to as "oxidized cellulose fibers."

The compound having a carboxy group for use in the introduction of the cellulose fibers with a carboxy group is not particularly limited, and specific examples include halogenated acetic acids, and the halogenated acetic acid includes chloroacetic acid and the like.

The acid anhydrides of a compound having a carboxy group and derivatives thereof, for use in the introduction of the cellulose fibers with a carboxy group include, but not particularly limited to, acid anhydrides of dicarboxylic acid compounds such as maleic anhydride, succinic anhydride, phthalic anhydride, and adipic anhydride; imidation products of the acid anhydrides of a compound having a carboxy group; and derivatives of the acid anhydrides of a compound having a carboxy group. These compounds may be substituted with a hydrophobic group.

(ii) A Case of Introducing Cellulose Fibers with a Sulfonate Group or a Phosphate Group as an Anionic Group The method of introducing cellulose fibers with a sulfonate group as an anionic group includes a method of adding sulfuric acid to the cellulose fibers and heating, and the like.

The method of introducing cellulose fibers with a phosphate group as an anionic group includes a method of mixing cellulose fibers which are in a dry state or a wet state with a powder or an aqueous solution of phosphoric acid or a phosphoric acid derivative; a method of adding an aqueous solution of phosphoric acid or a phosphoric acid derivative to a dispersion of cellulose fibers; and the like. When these methods are employed, a dehydration treatment, a heating treatment and the like are generally carried out after mixing or adding a powder or an aqueous solution of phosphoric acid or a phosphoric acid derivative.

Step of Subjecting Cellulose Fibers to Fiber Shortening Treatment

The cellulose fibers to be subjected to a fiber shortening treatment include
(1) anionically modified cellulose fibers obtained through the step of introducing the raw material cellulose fibers with an anionic group;
(2) modified cellulose fibers obtained through the steps of introducing the raw material cellulose fibers with an anionic group, and subsequently introducing the cellulose fibers with a modifying group; and (3) the raw material cellulose fibers.

The cellulose fibers to be subjected to a fiber shortening treatment are preferably the anionically modified cellulose fibers of (1), from the viewpoint of exhibiting the effects of the present invention. By the fiber shortening treatment, the average fiber length of the cellulose fibers can be 1 μm or more, preferably 5 μm or more, and more preferably 10 μm or more, and 500 μm or less, preferably 400 μm or less, more preferably 300 μm or less, and even more preferably 250 μm or less. The average fiber length can be measured in accordance with a method described in Examples set forth below.

The average fiber length of the cellulose fibers may be preferably 50 μm or more, 80 μm or more, or 100 μm or more, and may be preferably 250 μm or less, 220 μm or less, or 200 μm or less, from the viewpoint of satisfying both the dispersibility and the productivity.

The fiber shortening treatment can be accomplished by subjecting the cellulose fibers to one or more treatment methods selected from the group consisting of alkali treatment, acid treatment, heat treatment, ultraviolet treatment, electronic beam treatment, mechanical treatment, and enzyme treatment.

The conditions for the alkali treatment include conditions, for example, such that a solution or dispersion having a solid ingredient content of the cellulose fibers to be treated of preferably 0.1% by mass or more, and preferably 10.0% by mass or less, and having a pH of preferably 8.0 or more, and preferably 15.0 or less, is furnished, and that this solution or dispersion is heated at preferably 60° C. or higher, and preferably 110° C. or lower, for preferably 30 minutes or more, and preferably 240 minutes or less. The medium for the solution or dispersion is preferably water or ethanol. The alkali which can be used in the adjustment of a pH is preferably sodium hydroxide, lithium hydroxide, or potassium hydroxide. The solution or dispersion may contain hydrogen peroxide in an amount of preferably 0.5 parts by mass or more, and preferably 2.5 parts by mass or less, based on 100 parts by mass of the anionic group-containing cellulose fibers.

The conditions for the acid treatment include conditions, for example, such that a solution or dispersion having a solid ingredient content of the cellulose fibers to be treated of preferably 0.1% by mass or more, and preferably 10.0% by mass or less, and having a pH of preferably 0.1 or more, and preferably 4.0 or less, is furnished, and that this solution or dispersion is heated at preferably 80° C. or higher, and preferably 120° C. or lower, for preferably 5 minutes or more, and preferably 240 minutes or less. The medium for the solution or dispersion is preferably water or ethanol. The acid which can be used in the adjustment of a pH is preferably an inorganic acid such as hydrochloric acid, sulfuric acid, nitric acid, or phosphoric acid, and an organic acid such as acetic acid, citric acid, or malic acid, more preferably hydrochloric acid, sulfuric acid, nitric acid, phosphoric acid, acetic acid, or citric acid, and even more preferably hydrochloric acid, from the viewpoint of availability and costs.

The conditions for the thermal treatment include conditions, for example, such that a solution or dispersion having a solid ingredient content of the cellulose fibers to be treated which may optionally contain an inorganic salt, fine inorganic particles, fine organic particles, a surfactant, a preservative or the like in an amount of preferably 0.1% by mass or more, and preferably 80% by mass or less, is furnished, and that this solution or dispersion is heated at preferably 50° C. or higher, and preferably 230° C. or lower, for preferably 4 hours or more, and preferably 2500 hours or less. The medium for the solution or dispersion includes preferably water, N,N-dimethylformamide (DMF), ethanol, isopropanol (IPA), methyl ethyl ketone (MEK), ethyl acetate, toluene, cyclohexanone, and the like, and one or more members of these media can be used in combination.

Modified Cellulose Fibers

The modified cellulose fibers in the present invention are cellulose fibers in which anionically modified cellulose fibers are introduced with, i.e., bound to, a modifying group at an anionic group. The binding form of the anionic group and the modifying group in the modified cellulose fibers is preferably an ionic bonding and/or a covalent bonding, from the viewpoint of more fully exhibiting the effects of the present invention. The binding can be accomplished by ionically binding and/or covalently binding a compound having a modifying group to an anionic group that exists on the surface of the anionically modified cellulose fibers.

Step of Producing Modified Cellulose Fibers

The modified cellulose fibers can be produced by the steps of introducing an anionic group, introducing a modifying group, subjecting cellulose fibers to a fiber shortening treatment, and removing excess solvent components, irrespective of their orders. For example, the modified cellulose fibers can be produced by any one of the following steps of:

(1) introducing the raw material cellulose fibers with an anionic group to provide anionic group-containing anionically modified cellulose fibers, subjecting the anionic group-containing anionically modified cellulose fibers to a fiber shortening treatment, and subsequently introducing the cellulose fibers with a modifying group;

(2) introducing the raw material cellulose fibers with an anionic group to provide anionic group-containing anionically modified cellulose fibers, introducing the anionic group-containing anionically modified cellulose fibers with a modifying group, and subsequently subjecting the modified cellulose fibers obtained to a fiber shortening treatment; and (3) subjecting the raw material cellulose fibers to a fiber shortening treatment, introducing the shortened cellulose fibers with an anionic group to provide anionic group-containing anionically modified cellulose fibers, and subsequently introducing the above cellulose fibers with a modifying group.

It is more preferable to adopt the process of (1), from the viewpoint of exhibiting the effects of the present invention. Here, when the fiber length of the raw material cellulose fibers is 1,000 μm or less, the step of the above fiber shortening treatment can be omitted.

Step of Introducing Anionically Modified Cellulose Fibers with Modifying Group

The anionically modified cellulose fibers are modified with an optional modifying group to provide modified cellulose fibers. In order to bind a modifying group at an anionic group of the anionically modified cellulose fibers, for example, it is preferable to use a compound having a modifying group (also referred to as "a modifying species").

As the modifying species, an appropriate one may be selected depending upon the binding form with an anionic group.

When the binding form is an ionic bonding, the cellulose fibers can be introduced with a modifying group referring to Japanese Patent Laid-Open No. 2015-143336. Here, the modifying species includes metal inorganic base compounds, primary amines, secondary amines, tertiary amines, phosphonium compounds, and the like. Among them, the primary amines, the secondary amines, the tertiary amines, and the phosphonium compounds are preferred, from the viewpoint of dispersibility in an organic solvent or the like. To these compounds various hydrocarbon groups, for example, hydrocarbon groups such as acyclic saturated hydrocarbon groups, acyclic unsaturated hydrocarbon groups, cyclic saturated hydrocarbon groups, and aromatic hydrocarbon groups, and a copolymer moiety can be introduced as a modifying group. These groups or moieties may be used alone or in a combination of two or more kinds to be introduced. The number of carbon atoms of these various hydrocarbon groups is preferably 6 or more, from the viewpoint of dispersibility, and the number of carbon atoms is preferably 30 or less, more preferably 24 or less, and preferably 18 or less, from the same viewpoint.

The metal inorganic base compounds are preferably metal hydroxides, from the viewpoint of dispersibility in water, which include, for example, sodium hydroxide, potassium hydroxide, calcium hydroxide, strontium hydroxide, and the like. By using the above compound as a modifying species, sodium, potassium, calcium, or strontium can be introduced as a modifying group.

The primary to tertiary amines preferably have the number of carbon atoms of preferably 2 or more, and more preferably 6 or more, from the viewpoint of dispersibility, and the amines have the number of carbon atoms of preferably 30 or less, more preferably 24 or less, and even more preferably 18 or less, from the same viewpoint. Specific examples of the primary amines to the tertiary amines include, for example, propylamine, di propyl amine, butylamine, dibutylamine, hexylamine, 2-ethylhexylamine, dihexylamine, trihexylamine, octylamine, dioctylamine, dodecylamine, didodecylamine, distearylamine, oleylamine, octadecylamine, and dimethylbehenylamine. Among them, hexylamine, 2-ethylhexylamine, dihexylamine, trihexylamine, octylamine, dodecylamine, and oleylamine are preferred, from the viewpoint of dispersibility.

When a phosphonium compound is used as a modifying species, the anionic component thereof includes preferably halide ions such as chloride ions and bromide ions, hydrogensulfate ions, perchlorate ions, tetrafluoroborate ions, hexafluorophosphate ions, trifluoromethanesulfonate ions, and hydroxy ions, and more preferably includes hydroxy ions, from the viewpoint of the reactivities.

In a case where the binding form is covalent binding, for example, when the anionic group is modified, for example, via an amide bonding, a modifying group can be introduced by referring to Japanese Patent Laid-Open No. 2015-443337. Here, as the modifying species, for example, it is preferable to use primary amines and secondary amines. When the anionic group is modified via an ester bonding, it is preferable to use, for example, an alcohol such as butanol, octanol, and dodecanol as a modifying species. When the anionic group is modified via a urethane bonding, it is preferable to use, for example, an isocyanate compound as a modifying species. These compounds can be introduced with various hydrocarbon groups as a modifying group, including, for example, hydrocarbon groups such as acyclic saturated hydrocarbon groups, acyclic unsaturated hydrocarbon groups, cyclic saturated hydrocarbon groups, and aromatic hydrocarbon groups, or a copolymer moiety or the like. Introduction of these groups or moieties may be carried out alone or in a combination of two or more kinds.

In the case where the modifying group contains a copolymer moiety, as the copolymer moiety, for example, an ethylene oxide/propylene oxide EOPO copolymer moiety or the like can be used. The EOPO copolymer moiety means a structure in which ethylene oxides (EO) and propylene oxides (PO) are polymerized in a random or block form.

When the modifying species is an amine having an EOPO copolymer moiety and an amino group, the amine having an EOPO copolymer moiety (also referred to as "EOPO amine"), for example, includes the compound represented by the following formula (i):

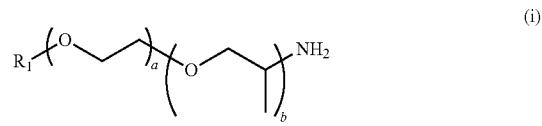

wherein $R_1$ is a hydrogen atom, a linear or branched alkyl group having from 1 to 6 carbon atoms, in which EO and PO are present in a random or block form; a is a positive number showing an average number of moles of EO added; and b is a positive number showing an average number of moles of PO added, and wherein an alkylene group having 1 to 3 carbon atoms may be present between the amino group and EO or PO in the formula (i).

It is preferable that $R_1$ is a hydrogen atom, from the viewpoint of dispersibility. When $R_1$ is a linear or branched alkyl group having from 1 to 6 carbon atoms, the alkyl group is preferably a methyl group, an ethyl group, an n-propyl group and a sec-propyl group.

a in the formula (i) shows an average number of moles of EO added, and it is preferably 1 or more, more preferably 3 or more, and even more preferably 5 or more, from the viewpoint of even more improving the dispersibility, and it is preferably 100 or less, more preferably 70 or less, and even more preferably 50 or less, from the same viewpoint.

b in the formula (i) shows an average number of moles of PO added, and it is preferably 1 or more, and more preferably 3 or more, from the viewpoint of even more improving the dispersibility, and it is preferably 100 or less, and more preferably 50 or less, from the same viewpoint.

The molecular weight of the EOPO copolymer moiety is preferably 100 or more, more preferably 200 or more, even more preferably 300 or more, and even more preferably 500 or more, from the viewpoint of dispersibility. The molecular weight is preferably 10,000 or less, more preferably 8,000 or less, even more preferably 5,000 or less, and even more preferably 3,000 or less, from the same viewpoint.

As the EOPO amines, for example, a commercially available product can be suitably used. Specific examples thereof include Jeffamine M-2070, Jeffamine M-2005, Jeffamine M-2095, Jeffamine M-1000, Jeffamine M-600, Surfoamine B200, Surfoamine L100, Surfoamine L200, Surfoamine L207, Surfoamine L300, XTJ-501, XTJ-506, XTJ-507, XTJ-508, Jeffamine M3000, Jeffamine ED-900, Jeffamine ED-2003, Jeffamine D-2000, Jeffamine D-4000, XTJ-510, Jeffamine T-3000, JeffamineT-5000, XTJ-502, XTJ-509, XTJ-510, manufactured by HUNTSMAN, and the like.

The details of the amine having an EOPO copolymer moiety represented by the formula (i) are described in, for example, Japanese Patent Gazette No. 6,105,139.

Here, the step of producing modified cellulose fibers may be carried out in the presence of a solvent. The solvent includes, but not particularly limited to, for example, water, isopropanol (IPA), t-butanol, N,N-dimethylformamide (DMF), acetone, methyl ethyl ketone (MEK), methyl isobutyl ketone (MIBK), cyclohexanone, toluene, methyl acetate, ethyl acetate, acetonitrile, dimethyl sulfoxide (DMSO), dimethyl acetamide, 1,3-dimethyl-2-imidazolizinone, hexane, 1,4-dioxane, and mixtures thereof.

In addition, the use of "third kind organic solvents under the rules of the organic solvent toxicity prevention and/or organic solvents that are not defined in the rules of the organic solvent toxicity prevention" (simply abbreviated as "specified solvents" hereinbelow) is preferred, from the viewpoint of considerations to the operating environments. Specific examples of the specified solvents include hydrocarbons such as cyclohexane, isohexane, and n-heptane; alcohols such as ethanol, n-propyl alcohol, octanol, and benzyl alcohol; esters such as butyl cellosolve acetate, ethyl carbitol acetate, butyl carbitol acetate, propylene glycol monomethyl ether acetate, methoxybutyl acetate, methyl methoxybutyl acetate, ethyl-3-ethoxy propionate, propylene glycol monomethyl ether propionate, dibasic acid esters, and dimethyl carbonate; ketones such as methyl hexyl ketone, diisobutyl ketone, diacetone alcohol, and isophorone; glycol ethers such as t-butyl glycol, methyl diglycol, ethyl diglycol, butyl diglycol, 1-methoxy-2-propanol, methyldipropylene glycol, 3-methoxybutanol, and 3-methyl-3-methoxybutanol; nitrogen-based solvents such as N,N-dimethylacetamide and N-methyl-2-pyrrolidone.

Step of Drying Modified Cellulose Fibers

The drying method for the modified cellulose fibers includes, but not particularly limited to, for example, freeze drying, vacuum drying, compressing, air-drying, hot-air drying, spray drying, infrared drying, spin drying, and the like: Specific conditions in the drying method are not particularly limited, and general conditions can be employed. The upper limit of the temperature during drying is preferably 300° C., more preferably 250° C., and even more preferably 200° C., from the viewpoint of preventing the decomposition due to heating.

Powder of Modified Cellulose Fibers

As to the powder of modified cellulose fibers of the present invention, the larger the amount of the solid content ingredient, the more preferred, from the viewpoint of handling property. For example, the residual portion of the powder of modified cellulose fibers obtained from the following formula in accordance with a method for measurement for heated residual portion (solid content ingredient) described in JIS K 5601-1-2: 2008 is preferably 50% by mass or more, more preferably 60% by mass or more, even more preferably 70% by mass or more, even more preferably 80% by mass or more, and even more preferably 90% by mass or more, from the viewpoint of exhibiting the effects of the present invention, and the residual portion is preferably 99% by mass or less, more preferably 98% by mass or less, even more preferably 97% by mass or less, and even more preferably 95% by mass or less, from the viewpoint of drying loads. The residual portion of the powder of modified cellulose fibers is measured in accordance with a method described in Examples set forth below.

Residual Portion, % by mass=[(Mass of the powder of modified cellulose fibers when heated at 105° C. for 60 minutes)/(Mass of the powder of modified cellulose fibers before heating)]×100

The average fiber length of the powder of modified cellulose fibers of the present invention is 1 μm or more, preferably 5 μm or more, and more preferably 10 μm or more, and 500 μm or less, preferably 400 μm or less, more preferably 350 μm or less, and even more preferably 300 μm or less, from the viewpoint of dispersibility. The average fiber length of the powder of modified cellulose fibers can be accomplished by a fiber shortening treatment mentioned above, which can be measured in accordance with a method described in Examples set forth below.

The average fiber diameter of the powder of modified cellulose fibers of the present invention is preferably 0.1 μm or more, preferably 0.5 μm or more, and more preferably 1 μm or more, from the viewpoint of dispersibility. In addition, the average fiber diameter is preferably 200 μm or less, and more preferably 100 μm or less. The average fiber diameter of the powder of modified cellulose fibers can be measured in accordance with a method described in Examples set forth below.

The average degree of polymerization of the cellulose component in the powder of modified cellulose fibers of the present invention is preferably 10 or more, more preferably 20 or more, more preferably 30 or more, more preferably 40 or more, more preferably 50 or more, and more preferably 70 or more, and preferably 500 or less, more preferably 400 or less, more preferably 300 or less, more preferably 250 or less, more preferably 200 or less, more preferably 150 or less, and even more preferably 100 or less, from the viewpoint of dispersibility. The adjustment to a lower average degree of polymerization of the powder of modified cellulose fibers can be accomplished by a fiber shortening treatment mentioned above, and the average degree of polymerization can be measured in accordance with a method described in Examples set forth below.

The powder of modified cellulose fibers of the present invention has cellulose I crystal structure owing to the use of natural cellulose fibers as the raw materials. The cellulose I refers to a crystalline form of a natural cellulose, and the cellulose I crystallinity means a proportion of the amount of cellulose I crystalline region that occupies the entire cellulose.

The cellulose I crystallinity of the powder of modified cellulose fibers of the present invention is preferably 30% or more, from the viewpoint of exhibiting the mechanical properties, and on the other hand, the cellulose I crystallinity is preferably 95% or less. Here, the cellulose I crystallinity as used herein is specifically measured in accordance with a method described in Examples set forth below.

Dispersion

The dispersion of the present invention is a dispersion containing a powder of modified cellulose fibers mentioned above and a medium, wherein the powder is dispersed in the medium. By dispersing a powder of modified cellulose fibers of the present invention in a medium such as an organic solvent or a resin, a dispersion containing fine modified cellulose fibers having excellent handling property can be prepared. The dispersion can be suitably used in various industrial applications such as daily sundries, household electric appliance parts, packaging materials for household electric appliances, automobile parts, airplane parts, sporting goods, and materials for three-dimensional modeling.

The amount of the powder of modified cellulose fibers in the dispersion, calculated in terms of the blending amount, is preferably 0.1% by mass or more, more preferably 03% by mass or more, and even more preferably 0.5% by mass or more. On the other hand, the amount is preferably 90% by mass or less, more preferably 80% by mass or less, even more preferably 70% by mass or less, and even more preferably 65% by mass or less.

Medium

The medium is not particularly limited, and water, various organic solvents, monomers, prepolymers, resins, curing agents, plasticizers, or the like can be suitably used. More specifically, the medium is preferably one or more members selected from the group consisting of water, N,N-dimethylformamide (DMF), N-methylpyrrolidone (NMP), methanol, ethanol, isopropanol (IPA), methyl ethyl ketone (MEK), ethyl acetate, butyl acetate, toluene, acetone, cyclohexanone, hexane, polyethylene glycol, polypropylene glycol and prepolymers (for example, epoxy resin prepolymers, urethane resin prepolymers, acrylic resin prepolymers, silicone resin prepolymers, phenoxy resin prepolymers). Here, the media can be used alone or in a combination of two or more kinds.

The amount of the medium in the dispersion, calculated in terms of the blending amount, is preferably 10% by mass or more, more preferably 20% by mass or more, more preferably 30% by mass or more, and even more preferably 35% by mass or more. On the other hand, the amount is preferably 99.9% by mass or less, more preferably 99% by mass or less, even more preferably 95% by mass or less, and even more preferably 90% by mass or less.

Method for Producing Dispersion Containing Fine Modified Cellulose Fibers

As the method for producing a dispersion containing fine modified cellulose fibers, the dispersion can be obtained by subjecting a dispersion of the present invention mentioned above to a mechanical, finely pulverizing treatment with an agitator equipped with agitation blades, a disintegrator, a beating machine, a low-pressure homogenizer, a high-pressure homogenizer, a grinder, a cutter mill, a ball-mill, a jet mill, a roller mill, a short shaft kneader, a twin-screw kneader, a short shaft extruder, a twin-screw extruder, an ultrasonic agitator, a juice mixer for households, or the like. Here, the treatment conditions such as temperatures and pressures may be adjusted as needed.

Resin Composition

The resin composition of the present invention is a composition containing a powder of modified cellulose fibers mentioned above and a resin, wherein the powder of modified cellulose fibers and the resin are blended. Since a molded article can be produced in accordance with a known molding method by using the resin composition, the resin composition is one of the preferred embodiments according to the present invention.

Resin

The resin which can be used is not particularly limited, and, for example, a thermoplastic resin, a curable resin, a cellulosic resin, or an elastomeric resin can be used. The thermoplastic resin, the curable resin, the cellulosic resin, and the elastomeric resin may be used as the resin, alone or in a combination of two or more kinds.

Thermoplastic Resin

The thermoplastic resin includes saturated polyester resins such as polylactic acid resins; olefinic resins such as polyethylene resins and polypropylene resins; vinyl resins such as vinyl chloride resins, vinylidene chloride resins, styrene resins, vinyl ether resins, polyvinyl alcohol resins, polyvinyl acetal resins, and polyvinyl acetate resins; (meth)acrylic resins; polyamide resins; polycarbonate resins; polysulfonate resins; polyurethane resins; phenoxy resins; and the like. These thermoplastic resins may be used alone or may be used as mixed resins of two or more kinds, Among them, the olefinic resins, the polycarbonate resins, the (meth)acrylic resins, the vinyl chloride resins, and the polyurethane resins are preferred, because the dispersion having excellent dispersibility is obtained. Here, the term (meth)acrylic resin as used herein means the concepts embracing methacrylic resins and acrylic resins.

As the (meth)acrylic resin, those containing 50% by weight or more of methyl (meth)acrylate as a monomer unit, on the basis of a total of the monomer units of the entire polymer constituting the resin are preferred, and a methacrylic resin is more preferred.

The methacrylic resin can be produced by copolymerizing methyl methacrylate and other monomer copolymerizable therewith. The polymerization method is not particularly limited, and includes, for example, a bulk polymerization method, a solution polymerization method, a suspension polymerization method, a casting polymerization method, e.g. a cell casting polymerization method, and the like.

Curable Resin

The curable resin is preferably a photo-curable resin and/or a thermosetting resin.

The photo-curable resin allows to progress the polymerization reaction by irradiation of active energy rays such as ultraviolet rays or electron beams, using a photopolymerization initiator that generates a radical or a cation.

The above photopolymerization initiator includes, for example, acetophenones, benzophenones, ketals, anthraquinones, thioxanthenes, azo compounds, peroxides, 2,3-dialkyldione compounds, disulfide compounds, thiuram compounds, fluoroamine compounds, and the like. More specifically, the photopolymerization initiator includes compounds listed in paragraph 0113 of Japanese Patent Laid-Open No. 2018-024967.

With the photopolymerization initiator, for example, a monomer (monofunctional monomer, polyfunctional monomer), or an oligomer or resin or the like, having a reactive unsaturated group can be polymerized.

The monofunctional monomer includes, for example, (meth)acrylic monomers such as (meth)acrylic acid esters; vinyl-based monomers such as vinyl pyrrolidone; (meth)acrylates having a bridged cyclohydrocarbon group such as isobornyl (meth)acrylate and adamantyl (meth)acrylate; and the like. The polyfunctional monomer contains a polyfunctional monomer having 2 to 8 or so polymerizable groups, and the bifunctional monomer includes, for example, di(meth)acrylates having a bridged cyclohydrocarbon group such as ethylene glycol di(meth)acrylate and propylene glycol di(meth)acrylate, and the like. The tri- to octo-functional monomer includes, for example, glycerol tri(meth)acrylate, and the like.

Examples of the oligomer or resin having a reactive unsaturated group include (meth)acrylates of alkylene oxide adducts of bisphenol A, epoxy (meth)acrylates (bisphenol A type epoxy (meth)acrylate, novolak type epoxy (meth)acrylate, etc.), polyester (meth)acrylates (e.g., aliphatic polyester-type (meth)acrylates, aromatic polyester-type (meth)acrylates, etc.), urethane (meth)acrylates (polyester-type urethane (meth)acrylates, polyether-type urethane (meth)acrylates, etc.), silicone (meth)acrylates, and the like. The above oligomer or resin may be used together with the above monomer.

The photo-curable resin is preferred, from the viewpoint of providing a dispersion or a resin molded article having a smaller amount of aggregates, and having excellent transparency.

The thermosetting resin includes, for example, epoxy resins, phenoxy resins, phenolic resins, urea resins, melamine resins, unsaturated polyester resins, diallyl phthalate resins, polyurethane resins, silicone resins, polyimide resins, and the like. The thermosetting resin can be used alone or in a combination of two or more kinds. Among them, the epoxy resins, the phenoxy resins, the phenolic resins, the urea resins, the melamine resins, the unsaturated polyester resins, and the polyurethane resins are preferred, and the epoxy resins, the phenolic resins, the phenoxy resins, and the polyurethane resins are more preferred, because of providing a dispersion having excellent dispersibility.

When the above resin components are used, it is preferable to use a curing agent. By blending a curing agent, resin molded articles obtained from the dispersion containing the resin can be firmly molded, whereby the mechanical strength can be improved. Here, the blending amount of the curing agent may be appropriately set depending upon the kinds of the resins and/or the kinds of the curing agents used.

Cellulosic Resin

The cellulosic resin includes organic acid esters of cellulose mixed acylates such as cellulose acetate and cellulose acetate propionate; inorganic acid esters such as nitrate cellulose and phosphate cellulose; mixed acid esters of organic acid-inorganic acid such as acetate nitrate cellulose; cellulose ether esters such as acetylated hydroxypropyl cellulose; and the like. The above cellulose acetate includes cellulose triacetate (degree of acetyl substitution: 2.6 to 3), cellulose diacetate (degree of acetyl substitution: 2 or more and less than 2.6), and cellulose monoacetate. The cellulosic resins may be used alone or in a combination of two or more kinds.

Elastomeric Resin

In addition, in the present invention, an elastomeric resin can be used as the resin. In the elastomeric resin, a blended product of an inorganic filler such as carbon black or silica is widely used as a reinforcing material in order to increase the strength, but the reinforcing effects are considered to have some limitations. However, it is considered that since a dispersion obtained by blending a dispersion of the present invention with an elastomeric resin has excellent dispersibility, it is made possible to provide a dispersion or a molded article (a rubber) having excellent mechanical strength and heat resistance.

As the elastomeric resin, a diene-based rubber or a non-diene-based rubber is preferred.

The diene-based rubber includes natural rubbers, polyisoprene rubbers, polybutadiene rubbers, styrene-butadiene copolymer rubbers, butyl rubbers, butadiene-acrylonitrile copolymer rubbers, chloroprene rubbers, modified natural rubbers, and the like. The modified natural rubber includes epoxidized natural rubbers, hydrogenated natural rubbers, and the like. The non-diene-based rubber includes butyl rubbers, ethylene-propylene rubbers, ethylene-propylene-diene rubbers, urethane rubbers, silicone rubbers, fluorine-containing rubbers, acrylic rubbers, vulcanized rubbers, epichlorohydrin rubbers, and the like. These can be used alone or in a combination of two or more kinds.

Comprehensively, the resin to be blended in the resin composition is preferably one or more members selected from the group consisting of the olefinic resins, the polyurethane resins, the polycarbonate resins, the (meth)acrylic resins, the epoxy resins, the phenolic resins, the phenoxy resins, the vinyl resins, and the elastomeric resins.

The amount of the resin in the resin composition of the present invention is not unconditionally determined because the amount depends upon the physical properties or the molding methods of the resin, and the amount, calculated in terms of the blending amount, is preferably 10% by mass or more, more preferably 20% by mass or more, more preferably 30% by mass or more, and even more preferably 40% by mass or more, from the viewpoint of exhibiting the properties inherently owned by the resin, and on the other hand, the amount is preferably 99.9% by mass or less, more preferably 99% by mass or less, more preferably 90% by mass or less, and even more preferably 80% by mass or less, from the viewpoint of economic advantages.

The amount of the powder of modified cellulose fibers in the resin composition of the present invention is not unconditionally determined because the amount depends upon the physical properties or the molding methods of the resin, and the amount, calculated in terms of the blending amount, based on 100 parts by mass of the resin, is preferably 0.1 parts by mass or more, more preferably 0.3 parts by mass or more, even more preferably 0.5 parts by mass or more, and even more preferably 1 part by mass or more, from the viewpoint of exhibiting the additive effects of the powder of modified cellulose fibers, and on the other hand, the amount is preferably 100 parts by mass or less, more preferably 50 parts by mass or less, even more preferably 30 parts by mass or less, and even more preferably 20 parts by mass or less.

Other Components

The resin composition of the present invention can be blended with, besides the components mentioned above, a plasticizer, a crystal nucleating agent, a filler including an inorganic filler and an organic filler, a hydrolysis inhibitor, a flame retardant, an antioxidant, a lubricant such as a hydrocarbon wax or an anionic surfactant, an ultraviolet absorbent, an antistatic agent, an anti-clouding agent, a photostabilizer, a pigment, a mildewproof agent, a bactericidal agent, a blowing agent, or a surfactant; a polysaccharide such as starch or alginic acid; a natural protein such as gelatin, glue, or casein; an inorganic compound such as tannin, zeolite, ceramics, or a metal powder; a perfume; a fluidity modulator; a leveling agent; an electroconductive agent; an ultraviolet dispersant; a deodorant; or the like, within the range that would not impair the effects of the present invention. In addition, similarly, other polymeric materials and other resin compositions can be added within the range that would not impair the effects of the present invention.

The plasticizer is not particularly limited, and includes polycarboxylate esters such as phthalate esters, succinate esters, and adipate esters; fatty acid esters of an aliphatic polyol such as glycerol; and the like, which are conventional plasticizers. Specific examples include plasticizers listed in Japanese Patent Laid-Open Nos. 2008-174718 and 2008-115372.

In addition, when the resin composition is blended with an elastomeric resin, besides those mentioned above, the resin composition can be optionally blended with various additives generally blended in tires and other rubbers as other components that are ordinarily used in the rubber industries, including fillers for reinforcements such as carbon black or silica, various chemicals including, for example, a vulcanizing agent, a vulcanization accelerator, an aging inhibitor, a scorching inhibitor, zinc oxide, stearic acid, a process oil, a vegetable fat or oil, a plasticizer or the like in a conventional general amount within the range that would not impair the object of the present invention.

The amount of "the other components" in the resin composition of the present invention is not particularly limited, and the amount, calculated in terms of blending amount, is preferably 0.1% by mass or more, and more preferably 0.5% by mass or more, and preferably 30% by mass or less, and more preferably 10% by mass or less, from the viewpoint of exhibiting the given effects.

Method for Preparing Resin Composition

The resin composition can be prepared by subjecting a resin and a powder of modified cellulose fibers mentioned above, and a medium mentioned above to a dispersion treatment with a high-pressure homogenizer, together with the other components. Alternatively, the resin composition can be prepared by agitating each of these raw materials with a Henschel mixer, a co-rotating agitator or the like, or melt-kneading each of these components with a known kneader such as a tightly closed kneader, a single-screw or twin-screw extruder, or an open roller-type kneader.

Resin Molded Article

The resin molded article of the present invention can be produced by appropriately using a known molding method such as extrusion-molding, injection-molding, press molding, casting molding, or solvent casting utilizing the resin composition. Since the resin composition of the present invention has excellent dispersibility of the modified cellulose fibers, the mechanical strength of the various resin manufactured articles which are molded articles is more improved than the conventional products. For this reason, the resin molded article can be suitably used in various applications.

The applications for which the resin composition and the resin molded article can be used are not particularly limited, and the resin composition and the resin molded article can be used in, for example, transparent resin materials, three-dimensional modeling materials, cushioning materials, repairing materials, bonding agents, adhesives, sealing materials, heat insulators, acoustic materials, artificial leather materials, paints, electronic materials, wrapping materials, tires, automobile parts, and fiber composite materials. Among them, particularly, the applications for transparent resin materials, bonding agents, adhesives, artificial leather materials, paints, electronic materials, and fiber composite materials are preferred, from the viewpoint of obtaining a molded article having excellent transparency, and the applications for three-dimensional modeling materials, cushioning materials, repairing materials, sealing materials, heat insulators, acoustic materials, tires, automobile parts, and wrapping materials are preferred, from the viewpoint of exhibiting the strength.

With respect to the above-mentioned embodiments, the present invention further discloses the following powders of modified cellulose fibers, dispersions containing the powder and a medium, wherein the powder is dispersed in a medium, resin compositions containing the powder and a resin, wherein the powder and the resin are blended, and resin molded articles obtained by molding the resin composition.

<1> A powder of modified cellulose fibers having an average fiber length of 1 μm or more and 500 μm or less, wherein the anionically modified cellulose fibers are introduced with a modifying group at an anionic group.

<2> A powder of modified cellulose fibers having an average fiber length of 50 μm or more and 300 μm or less, wherein the anionically modified cellulose fibers are introduced with a modifying group at an anionic group.

<3> A powder of modified cellulose fibers having an average fiber length of 80 μm or more and 250 μm or less, wherein the anionically modified cellulose fibers are introduced with a modifying group at an anionic group.

<4> A powder of modified cellulose fibers having an average fiber length of 100 μm or more and 200 μm or less, wherein the modified cellulose fibers are made from anionically modified cellulose fibers introduced at an anionic group with a modifying group.

<5> The powder of modified cellulose fibers according to any one of <1> to <4>, wherein the residual portion of the powder of modified cellulose fibers obtained by the following formula:

Residual Portion, % by mass=[(Mass of the powder of modified cellulose fibers when heated at 105° C. for 60 minutes)/(Mass of the powder of modified cellulose fibers before heating)×100 is 50% by mass or more.

<6> The powder of modified cellulose fibers according to any one of <1> to <5>, wherein the anionic group in the anionically modified fibers is a carboxy group.

<7> The powder of modified cellulose fibers according to any one of <1> to <6>, wherein the binding form of the anionic group and the modifying group in the modified cellulose fibers is an ionic bonding and/or a covalent bonding.

<8> The powder of modified cellulose fibers according to any one of <1> to <7>, wherein the anionically modified cellulose fibers are originated from oxidation of TEMPO.

<9> The powder of modified cellulose fibers according to any one of <1> to <8>, wherein the amount of the anionic group in the anionically modified cellulose fibers is 0.2 mmol/g or more.

<10> The powder of modified cellulose fibers according to any one of <1> to <9>, wherein the water content is 15% by mass or less.

<11> The powder of modified cellulose fibers according to any one of <1> to <10>, wherein the water content is 10% by mass or less.

<12> The powder of modified cellulose fibers according to any one of <1> to <11>, wherein the water content is 5% by mass or less.

<13> The powder of modified cellulose fibers according to any one of <1> to <12>, wherein the water content is not substantially contained.

<14> The powder of modified cellulose fibers according to any one of <1> to <13>, which is a dried product.

<15> A dispersion containing a powder of modified cellulose fibers as defined in any one of <1> to <14> and a medium, wherein the powder is dispersed in the medium.

<16> The dispersion according to <15>, wherein the medium is one or more members selected from water, N,N-dimethylformamide (DMF), ethanol, isopropanol (IPA), methyl ethyl ketone (MEK), ethyl acetate, toluene, acetone, and cyclohexanone.

<17> The dispersion according to <15> or <16>, wherein the amount of the medium in the dispersion, calculated in terms of blending amount, is preferably 10% by mass or more and 99.9% by mass or less, more preferably 20% by mass or more and 99% by mass or less, even more preferably 30% by mass or more and 95% by mass or less, and even more preferably 35% by mass or more and 90% by mass or less.

<18> A resin composition containing a powder of modified cellulose fibers as defined in any one of <1> to <14> and a resin, wherein the powder and the resin are blended.

<19> The resin composition according to <18>, wherein the amount of the resin in the resin composition, calculated in terms of blending amount, is preferably 10% by mass or more and 99.9% by mass or less, more preferably 20% by mass or more and 99% by mass or less, even more preferably 30% by mass or more and 90% by mass or less, and even more preferably 40% by mass or more and 80% by mass or less.

<20> The resin composition according to <18> or <19>, wherein the resin is one or more members selected from thermoplastic resins, curable resins, cellulosic resins, and elastomeric resins.

<21> The resin composition according to <20>, wherein the curable resin is one or more members selected from photo-curable resins and thermosetting resins.

<22> The resin composition according to <21>, wherein the photo-curable resin is selected from one or more members selected from monomers (monofunctional monomers, polyfunctional monomers), oligomers having a reactive unsaturated group, and resins having a reactive unsaturated group.

<23> The resin composition according to <21>, wherein the thermosetting resin is one or more members selected from epoxy resins, phenoxy resins, phenolic resins, urea resins, melamine resins, unsaturated polyester resins, diallyl phthalate resins, polyurethane resins, silicone resins, and polyimide resins.

<24> A composition containing a powder of modified cellulose fibers as defined in any one of <1> to <14>, a medium, and a resin.

<25> The composition according to <24>, wherein the medium is one or more members selected from water, N,N-dimethylformamide (DMF), ethanol, isopropanol (IPA), methyl ethyl ketone (MEK), ethyl acetate, toluene, cyclohexanone, and acetone.

<26> The composition according to <24> or <25>, Wherein the amount of the medium in the composition, calculated in terms of blending amount, is preferably 10% by mass or more and less than 99.9% by mass or less, more preferably 20% by mass or more and 99% by mass or less, even more preferably 30% by mass or more and 95% by mass or less, and even more preferably 35% by mass or more and 90% by mass or less.

<27> The composition according to any one of <24> to <26>, wherein the resin is one or more members selected from epoxy resins, phenoxy resins, phenolic resins, urea resins, melamine resins, unsaturated polyester resins, diallyl phthalate resins, polyurethane resins, silicone resins, and polyimide resins.

<28> The composition according to any one of <24> to <27>, wherein the amount of the resin in the composition, calculated in terms of blending amount, is preferably 10% by mass or more and 99.9% by mass or less, more preferably 20% by mass or more and 99% by mass or less, even more preferably 30% by mass or more and 90% by mass or less, and even more preferably 40% by mass or more and 80% by mass or less.

<29> A resin molded article obtained by molding a resin composition as defined in any one of <18> to <23>, or a composition as defined in any one of <24> to <28>.

<30> Use of a powder of modified cellulose fibers as defined in any one of <1> to <14> in the manufacture of a resin molded article as an additive.

<31> Use of a dispersion as defined in any one of <1.5> to <17> in the manufacture of a resin molded article as an additive.

EXAMPLES

The present invention will be described more specifically by means of the following Examples. Here, the Examples are mere exemplifications of the present invention, without intending to limit the present invention thereto. Parts in Examples are parts by mass unless specified otherwise. Here, "ambient pressure" means 101.3 kPa, and "room temperature" means 25° C.

Average Fiber Diameter and Average Fiber Length of Raw Material Cellulose Fibers, Anionically Modified Cellulose Fibers, or Modified Cellulose Fibers Ion-exchanged water is added to cellulose fibers to be measured, to provide a dispersion, a content of which is 0.01% by mass. The dispersion is measured with a wet-dispersion type image analysis particle counter manufactured by JASCO International Co., Ltd. under the trade name of IF-3200, under the conditions of a front lens: 2 folds, telecentric zoom lens: 1 fold, image resolution: 0.835 µm/pixel, syringe inner diameter: 6,515 µm, spacer thickness: 1,000 µm, image recognition mode: ghost, threshold value: 8, amount of analytical sample: 1 mL, and sampling: 15%. Ten thousands or more cellulose fibers are measured, an average ISO fiber diameter thereof is calculated as an average fiber diameter, and an average ISO fiber length is calculated as an average fiber length.

Average Fiber Diameter and Average Fiber Length of Finely Pulverized Anionically Modified Cellulose Fibers or Finely Pulverized Modified Cellulose Fibers A medium is added to modified cellulose fibers to be measured to provide a dispersion of which concentration is 0.0001% by mass. The dispersion is added dropwise to mica (mica), and dried to provide an observation sample. A fiber height of the cellulose fibers in the observation sample is measured with an atomic force microscope (AFM), Nanoscope III Tapping mode AFM, manufactured by Digital Instrument, a probe used being Point Probe (NCH) manufactured by NANOSENSORS. During the measurement, 100 or more cellulose fibers are extracted from a microscopic image in which the cellulose fibers can be confirmed, and an average fiber diameter and an average fiber length are calculated therefrom.

Content of Anionic Group of Anionically Modified Cellulose Fibers

Cellulose fibers to be measured with the mass of 0.5 g on a dry basis are placed in a 100 mL beaker, ion-exchanged water or a mixed solvent of methanol/water=2/1 is added thereto to make up a total volume of 55 mL, and 5 mL of a 0.01 M aqueous sodium chloride solution is added thereto, to provide a dispersion. The dispersion is stirred until the cellulose fibers are sufficiently dispersed. A 0.1 M hydrochloric acid is added to this dispersion to adjust its pH to 2.5 to 3, and a 0.05 M aqueous sodium hydroxide solution is added dropwise to the dispersion with an automated titration instrument manufactured by DKK-TOA CORPORATION under the trade name of "AUT-710," under the conditions of a waiting time of 60 seconds. The values of electroconductivity and a pH are measured every minute. The measurements are continued up to a pH of 11 or so to obtain an electroconductivity curve. A titrated amount of sodium hydroxide is obtained from this electroconductivity curve, and the content of the anionic group of the cellulose fibers to be measured is calculated in accordance with the following formula:

Content of Anionic Group, mmol/g=Titrated Amount of Sodium Hydroxide×Aqueous Sodium Hydroxide Solution Concentration (0.05 M)/Mass of Cellulose Fibers to Be Measured (0.5 g)

Solid Ingredient Content in Dispersion or Dispersed Solution

Using a halogen moisture balance manufactured by Shimadzu Corporation under the trade name of MOC-120H, measurements with a one-gram sample are taken in a thermostat held at 150° C. every 30 seconds, and a value at which a weight loss is 0.1% or less is defined as a solid ingredient content.

Confirmation of Crystal Structure in Cellulose Fibers

The crystal structure of the cellulose fibers is confirmed by measuring with an X-ray diffractometer manufactured by Rigaku Corporation under the trade name of "Rigaku RIFT 2500VC X-RAY diffractometer" under the following conditions.

The measurement conditions are: X-ray source: Cu/Kα-radiation, tube voltage: 40 kv, tube current: 120 mA, measurement range: diffraction angle 2θ=5° to 45°, and scanning speed of X-ray: 10°/min. As a sample for the measurement, pellets compressed to a size having an area of 320 mm² and a thickness of 1 mm are used. Also, the crystallinity of the cellulose I crystal structure is calculated using X-ray diffraction intensity obtained based on the following formula (A):

Cellulose *I* Crystallinity, %=[($I_{22.6}$−$I_{18.5}$)/$I_{22.6}$]×100   (A)

wherein $I_{22.6}$ is a diffraction intensity of a lattice face (002 face) (angle of diffraction 2θ=22.6°), and $I_{18.5}$ is a diffraction intensity of an amorphous portion (angle of diffraction 2θ=18.5°), in X-ray diffraction.

Cellulose Fibers (Conversion Amount) in Modified Cellulose Fibers

The cellulose fibers (conversion amount) in the hydrophobically modified cellulose fibers (or powder of hydrophobically modified cellulose fibers) are measured in accordance with the following methods:

(1) In a Case where a Modifying Species to be Added is One Kind

The amount of the cellulose fibers (conversion amount) is calculated by the following formula A:

Amount of Cellulose Fibers (Conversion Amount), g=Mass of Hydrophobically Modified Cellulose Fibers, g/[1+Molecular Weight of Modifying Species, g/mol×Binding Amount of Modifying Group, mmol/g×0.001]   <Formula A>

(2) In a Case where Modifying Species to be Added are Two or More Kinds

The amount of the cellulose fibers (conversion amount) is calculated, taking a molar ratio of each of the modifying species (i.e., a molar ratio when a total molar amount of each of the modifying species to be added is defined as 1) into consideration.

Here, in a case where the binding form of the cellulose fibers and a modifying group is an ionic bonding, in the formula A mentioned above, the phrase "Molecular Weight of Modifying Species" refers to "a molecular weight of a modifying species itself." On the other hand, in a case where the binding form of the cellulose fibers and the modifying species is an amide bonding, in the formula A mentioned above, the phrase "Molecular Weight of Modifying Species" refers to "a molecular weight of a modifying species itself minus 18 (−18)."

Average Degree of Polymerization (DP) of Cellulosic Component in Cellulose Fibers The average degree of polymerization of the cellulosic component in the cellulose fibers is measured as follows.

(1) Preparation of Solutions for Measurements

One gram of the cellulose fibers are accurately weighed, a 1 M aqueous sodium hydroxide solution was added thereto until a pH reaches 10, 0.1 g of sodium borohydride is then added thereto, and the mixture is stirred at room temperature for 2 hours. Thereafter, 1 M hydrochloric acid is added thereto until a pH reaches 2, the mixture is centrifuged, and the filtered products are recovered. The procedures of adding 10 g of ion-exchanged water, centrifuging the mixture, and collecting the filtered products are carried out three times, and the recovered filtered products are subjected to freeze drying. The cellulose fibers to be measured in an amount of 0.1 g in dry mass are accurately weighed, and placed in a 100 mL beaker, and 50 mL of a 0.5 M copper ethylenediamine solution is added thereto. This mixture is stirred for one hour until the cellulose fibers are completely dissolved, to prepare a solution for measurement.

(2) Measurements of Average Degree of Polymerization

A solution for measurement obtained in the above (1) is placed in a Ubbelohde viscometer, and allowed to stand in a thermostat held at 20° C.±0.1° C. for one hour. Thereafter, a flow time is then measured. A relative viscosity $\eta_r$ is calculated in accordance with the following formula from a flow time (t, seconds) of a copper ammonia solution at various cellulose concentrations, g/dL, and a flow time ($t_0$, seconds) of the copper ammonium aqueous solution without addition of the cellulose:

$\eta_r = t/t_0$

Next, the reduced viscosity $\eta_{sp}/c$ is calculated in accordance with the following formula at each of the concentrations:

$\eta_{sp}/c = (\eta_r - 1)/c$, wherein c stands for a cellulose concentration, g/dL.

Further, an intrinsic viscosity $\eta$, dL/g, is obtained by extrapolating a reduced viscosity to c=0. An average degree of polymerization is calculated in accordance with the following formula:

$DP = 2000 \times [\eta]$

Residual Portion (Solid Content Ingredient) of Powder of Modified Cellulose Fibers The residual portion of the powder of modified cellulose fibers is measured as follows.

An about one gram sample is accurately weighed, and the mass of a powder of modified cellulose fibers is measured after drying the sample with an oven at a normal pressure, 105° C. for 60 minutes, as prescribed in JIS K 5601-1-2: 2008. Using a measurement value obtained, the residual portion of the powder of modified cellulose fibers is calculated using the following formula.

Residual Portion, % by mass=[(Mass of the powder of modified cellulose fibers when heated at 105° C. for 60 minutes)/(Mass of the powder of modified cellulose fibers before heating)×100

Preparation of Anionically Modified Cellulose Fibers

Preparation Example 1

Needle-leaf bleached kraft pulp manufactured by West Fraser, under the trade name of Hinton, having an average fiber diameter of 24 μm was used as natural cellulose fibers. As TEMPO, a commercially available product manufactured by ALDRICH, Free radical, 98% by mass, was used. As sodium hypochlorite, a commercially available product manufactured by Wako Pure Chemical Industries, Ltd. was used. As sodium bromide, a commercially available product manufactured by Wako Pure Chemical Industries, Ltd. was used.

First, 100 g of the above needle-leaf bleached kraft pulp fibers were sufficiently stirred in 9,900 g of ion-exchanged water, and 1.6 g of TEMPO, 10 g of sodium bromide, and 38.9 g of sodium hypochlorite were added in this order to 100 g of the pulp mass. Using a pH stud titration, a 0.5 M sodium hydroxide was added dropwise thereto to keep a pH at 10.5. The reaction was carried out at 20° C. for 120 minutes, and the dropwise addition of the sodium hydroxide was then stopped, to provide anionically modified cellulose fibers. The anionically modified cellulose fibers obtained were sufficiently washed with ion-exchanged water, until the filtrate had a conductivity as measured with a compact electroconductivity meter LAQUA twin EC-33B, manufactured by HORIBA, Ltd. of 200 μs/cm or less in the measurement, and the filtrate was then subjected to a dehydration treatment, to provide anionically modified cellulose fibers, a solid content ingredient of which was 20.0%.

Preparation Example 2

The same procedures as in Preparation Example 1 were carried out except that the amount of sodium hypochlorite used was changed to 28.4 g, and that the reaction time was changed to 30 minutes, to provide anionically modified cellulose fibers, a solid content ingredient of which was 41.6%.

Hydrothermal Treatment of Anionically Modified Cellulose Fibers

Preparation Example 3

A vial jar equipped with a magnetic stirrer and a stirring bar was charged with 0.72 g of anionically modified cellulose fibers obtained in Preparation Example 1, in terms of the absolutely dried mass. Ion-exchanged water was added thereto until the mass of the treatment solution became 36 g. The treatment solution was reacted at 95° C. for 8 hours, to provide an aqueous suspension of shortened anionically modified cellulose fibers.

Preparation Example 4

The same procedures as in Preparation Example 3 were carried out except that anionically modified cellulose fibers obtained in Preparation Example 2 were used, to provide an aqueous suspension of shortened anionically modified cellulose fibers.

Preparation Example 5

The same procedures as in Preparation Example 3 were carried out except that the reaction time for the treatment solution was changed to 72 hours, to provide an aqueous suspension of shortened anionically modified cellulose fibers.

Preparation Example 6

The same procedures as in Preparation Example 3 were carried out except that the reaction temperature for the treatment solution was changed to 80'C, to provide an aqueous suspension of shortened anionically modified cellulose fibers.

Production of Finely Pulverized Anionically Modified Cellulose Fibers

Preparation Example 7

Five grams of anionically modified cellulose fibers obtained in Preparation Example 1 were mixed with 195 g of ion-exchanged water, and the mixture was subjected to a finely pulverizing treatment three times at 150 MPa with a high-pressure homogenizer, to provide a dispersion of finely pulverized anionically modified cellulose fibers, a solid ingredient content of which was 1.0%.

The main properties of the anionically modified cellulose fibers obtained in each of the preparation examples are summarized in Table A.

TABLE A

| | Preparation Examples | | | | | |
|---|---|---|---|---|---|---|
| | 1 | 3 | 4 | 5 | 6 | 7 |
| Average Fiber Length, μm | 1001 | 157 | 233 | 99 | 273 | 0.7 |
| Content of Carboxy Group, mmol/g | 1.6 | 1.6 | 1.0 | 1.6 | 1.6 | 1.6 |

Production of Powders of Modified Cellulose Fibers

Examples 1 to 9

An aqueous suspension of anionically modified cellulose fibers obtained in Preparation Example 3 was mixed with ion-exchanged water, to provide anionically modified cellulose fibers, a solid ingredient content of which was 1.0% by mass. Next, an amine (of the kind listed in Table 1) in an amount corresponding to the amount of an amine group shown in Table 1, based on one mol of the carboxy groups contained in the anionically modified cellulose fibers, or a 1 M aqueous NaOH solution was added, until a pH of the solution reached 9.0. The mixture was stirred with a magnetic stirrer for 30 minutes, to provide modified cellulose fibers. The modified cellulose fibers obtained were freeze-dried with FDU-1110, manufactured by EYELA (a drying temperature: −80° C., a drying time: 24 hours, a degree of reduced pressure: 10 Pa), to provide each of powders of modified cellulose fibers. Here, as a representative example, the powder of modified cellulose fibers of Example 1 had heated residual portion of 96.4% by mass, an average fiber diameter of 33 μm, and an average degree of polymerization of 95.

Example 10

The same procedures as in Example 3 were carried out except that vacuum drying at 50° C., 133 Pa was carried out in place of the freeze drying, to provide a powder of modified cellulose fibers.

Examples 11 to 13 and Comparative Examples 1 and 2

The same procedures as in Example 3 were carried out except that anionically modified cellulose fibers obtained in Preparation Example 4 (Example 11), anionically modified cellulose fibers obtained in Preparation Example 5 (Example 12), an ionically modified cellulose fibers obtained in Preparation Example 6 (Example 13), an ionically modified cellulose fibers obtained in Preparation Example 7 (Comparative Example 1), or anionically modified cellulose fibers obtained in Preparation Example 1 (Comparative Example 2) were used, in place of anionically modified cellulose fibers obtained in Preparation Example 3, to provide each of the powders of modified cellulose fibers.

Comparative Example 3

The same procedures as in Example 3 were carried out except that an amine was not added, to provide a powder of unmodified cellulose fibers.

Test Example 1—Transmittance

A powder of modified (or unmodified) cellulose fibers prepared in each Example and each Comparative Example mentioned above and a dispersion medium listed in Table 1 were added so as to provide a powder of modified (or unmodified) cellulose fibers, a solid ingredient content of which was 1.0%, and the mixture was stirred with a magnetic stirrer at 100 rpm or more at 25° C. for 60 minutes, to prepare a dispersion. The transmittance of the dispersion of modified (or unmodified) cellulose fibers obtained at 660 nm was measured with an ultraviolet-visible spectrophotometer UV-VISIBLE SPECTROMETER UV-2550 manufactured by Shimadzu Corporation, and this value was used as an index of transparency. Here, the transmittance of the solvent to be used as a medium at 660 nm was defined as 100%. It is shown that the higher the numerical value, the more excellent the dispersibility.

TABLE 1

| | Ex. | | | | | | | | | | | | | Comp. Ex. | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 1 | 2 | 3 |
| Drying Method | Freeze-drying | | | | | | | | | Vacuum drying | Freeze-drying | | | Freeze-drying | | |
| Average Fiber Length, μm | | | | | 157 | | | | | | 233 | 99 | 273 | 0.7 | 1001 | 157 |
| Binding Form | | | | | | | | Ionic Bonding | | | | | | Ionic Bonding | | — |
| Modifying Species | EOPO Amine | | | | | | TBAH | Dipropyl-amine | Na | EOPO Amine | | | | EOPO Amine | | — |
| Amine Equivalent, based on COOH group | 0.1 | 0.5 | 1.0 | 1.0 | 1.0 | 1.0 | 1.0 | 1.0 | 0 | 1.0 | 1.0 | 1.0 | 1.0 | 1.0 | 1.0 | 0 |
| Dispersion Medium | | EW | | EtOH | DMF | MEK | | | | EW | | | | | EW | |
| Amount of Cellulose Fibers, calculated in terms of parts by mass | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Content of Modified (or Unmodified) Cellulose Fibers, parts by mass | 1.2 | 2.3 | 3.7 | 3.7 | 3.7 | 3.7 | 1.4 | 1.2 | 1.0 | 3.7 | 3.7 | 3.7 | 3.7 | 3.7 | 3.7 | 1.0 |
| Cellulose I Crystallinity, % | | | | | | 68 | | | | | | | | 68 | 69 | 68 |
| Transmittance, % | 35 | 75 | 85 | 68 | 90 | 37 | 82 | 81 | 75 | 83 | 34 | 87 | 19 | 1 | 1 | 2 |

Here, the details of each components in Table 1 or the like are as follows.
- EOPO amine: manufactured by HUNTSMAN, under the trade name of Jeffamine M-2070
- TBAH (tetrabutylammonium hydroxide)
- EW (ion-exchanged water)
- EtOH (ethanol)
- DMF (dimethylformamide)
- MEK (methyl ethyl ketone)

The "amine equivalent" refers to the number of moles of amine groups in the amine per one mol of carboxy group in the anionically modified cellulose fibers.

It could be seen from Table 1 that modified cellulose fibers in which shortened anionically modified cellulose fibers were introduced with a modifying group, having an average fiber length within a given range, had incommensurably high transmittance when once dried and made into a powder state and then dispersed in a medium, as compared to those of Comparative Examples, in other words, the dispersibility in a medium was excellent. It could be seen from. Comparative Examples 1 and 2 that even when the average fiber length was too small or too large, the dispersibility of the powder of modified cellulose fibers is dramatically lowered.

Epoxy Resin Composition

Example 14 and Comparative Example 4

An epoxy resin composition (Example 14) was produced using a powder of modified cellulose fibers prepared in Example 2 in accordance with the following method.

On the other hand, the same procedures as in Comparative Example 2 were carried out except that the amount of the EOPO amine used was changed to 0.5 equivalents, to provide a powder of modified cellulose fibers. The following epoxy resin composition (Comparative Example 4) was produced using this powder of modified cellulose fibers.

To a powder of modified cellulose fibers prepared in Example 2, or a powder of modified cellulose fibers prepared as mentioned above were added an epoxy resin prepolymer manufactured by Mitsubishi Chemical Corporation under the trade name of jER828, and a solvent DMF so as to have blending amounts listed in Table 2, and the mixture was stirred within a block heater equipped with a magnetic stirrer at 100 rpm or more at 80° C. for 180 minutes, to provide a liquid mixture. A curing agent 2-ethyl-4-methylimidazole, manufactured by Wako Pure Chemical. Industries, Ltd. was added to the liquid mixture obtained so as to have a blending amount as listed in Table 2, and the mixture was stirred with an agitator manufactured by THINKY CORPORATION under the trade name of Awatori Rentaro for 7 minutes, to provide an epoxy resin composition (Example 14 or Comparative Example 4).

Next, a paint coating was applied on a copper foil in a coating thickness of 0.5 mm with a bar coater. Thereafter, the coating was dried at 80° C. for 1 hour, to remove the solvent, and a dried coating was heat-cured at 150° C. for 1 hour, to provide a resin molded article made of an epoxy resin composition.

TABLE 2

|  | Ex. 14 | Comp. Ex. 4 |
|---|---|---|
| Powder of Modified Cellulose Fibers | Ex. 2 | (Comp. Ex. 2) |
| Drying Method | Freeze-drying | |
| Average Fiber Length, μm | 157 | 1001 |
| Binding form | Ionic bonding | |
| Modifying species | EOPO amine | |
| Amine equivalent, based on COOH groups | 0.5 | 0.5 |
| Resin | Epoxy prepolymer | |
| Epoxy prepolymer, parts by mass | 100 | |
| Curing agent, parts by mass | 5.0 | |
| Content of modified cellulose fibers, parts by mass | 2.3 | |
| Amount of cellulose fibers, calculated in terms of parts by mass | 1.0 | |
| Solvent, parts by mass | 30 | |
| Amount of coarse fibers | 1 | 3 |

Poly(Vinyl Chloride) Resin Composition

Example 15 and Comparative Example 5

A poly(vinyl chloride) resin composition (Example 15) was produced using a powder of modified cellulose fibers prepared in Example 2 in accordance with the following method.

On the other hand, the same procedures as in Comparative Examples 2 were carried out except that the amount of the EOPO amine used was changed to 0.5 equivalents, to provide a powder of modified cellulose fibers.

A powder of modified cellulose fibers prepared in Example 2, or a powder of modified cellulose fibers prepared as mentioned above was used and kneaded in a blending composition listed in Table 3 with a 50 milliliter tightly closed-type mixer at a temperature of 170° C. at a rotational speed of 60 rpm for 6 minutes, to provide a poly(vinyl chloride) resin mixture (Example 15 or Comparative Example 5). The poly(vinyl chloride) resin composition obtained was subjected to sheet molding in a mold with dimensions of 15×15×0.2 cm at 175° C. for 5 minutes, to provide a sheet, a resin molded article made of a poly(vinyl chloride) resin composition.

TABLE 3

|  | Ex. 15 | Comp. Ex. 5 |
|---|---|---|
| Powder of Modified Cellulose Fibers | Ex. 2 | (Comp. Ex. 2) |
| Drying Method | Freeze-drying | |
| Average Fiber Length, μm | 157 | |
| Binding Form | | |
| Modifying Species | EOPO Amine | |
| Amine Equivalents, based on COOH groups | 0.5 | 0.5 |
| Resin | Poly(vinyl chloride) | |
| Poly(vinyl chloride), parts by mass | 100 | |
| Plasticizer, parts by mass | 60.0 | |
| Stabilizer, parts by mass | 2.0 | |
| Lubricant, parts by mass | 0.5 | |
| Content of Modified Cellulose Fibers, parts by mass | 2.3 | |
| Amount of Cellulose Fibers, calculated in terms of parts by mass | 1.0 | |
| Amount of Coarse Fibers | 1 | 3 |

The raw materials in Table 3 are as follows.
- Poly(vinyl chloride) Resin: manufactured by SHINDAI-ICHI VINYL CORPORATION, under the trade name of ZEST 1400Z
- Stabilizer for Poly(vinyl chloride): manufactured by ADEKA, under the trade name of ADK STAB RUP-103

Plasticizer: Di-2-ethylhexyl phthalate; manufactured by Kao Corporation under the trade name of VINYCIZER 80

Lubricant: Stearic acid; manufactured by Kao Corporation, under the trade name of Lunac S70V Test Example 2—Amount of Coarse Filers The presence or absence of coarse fibers in epoxy resin compositions and poly(vinyl chloride) resin compositions prepared in Examples 14 and 15 and Comparative Examples 4 and 5 was observed with an optical microscope, and evaluated in accordance with the following evaluation criteria. The term "coarse fibers" as used herein refers to those observed as fibers of 100 μm or more when a composition was observed with an optical microscope at a magnification of 200 folds.

1: Coarse fibers are not observed.
2: Coarse fibers are partly confirmed.
3: Coarse fibers are confirmed in the entirety.

It could be seen from Tables 2 and 3 that even when a resin composition was prepared using a powder of modified cellulose fibers in which shortened anionically modified cellulose fibers were introduced with a modifying group, the dispersibility in the resin composition is excellent without aggregating the powders of modified cellulose fibers.

INDUSTRIAL APPLICABILITY

Since the powder of modified cellulose fibers of the present invention has high dispersibility, the dispersion containing finely pulverized hydrophobically modified cellulose fibers can be suitably used in various industrial applications such as daily sundries, household electric appliance parts, packaging materials for household electric appliances, and automobile parts, and more specifically, various resin manufactured articles for transparent resin materials, three-dimensional modeling materials, cushioning materials, repairing materials, adhesives, bonding agents, sealing materials, heat insulators, acoustic materials, artificial leather materials, paints, electronic materials, wrapping materials, sporting goods, tires, automobile parts, and fiber composite materials.

The invention claimed is:

1. A powder of modified cellulose fibers having an average fiber length of 1 μm or more and 500 μm or less, wherein the modified cellulose fibers are made from anionically modified cellulose fibers introduced at an anionic group with a modifying group, and wherein the powder of modified cellulose fibers has an average fiber diameter of 0.5 μm or more and 200 μm or less.

2. The powder of modified cellulose fibers according to claim 1, wherein the residual portion of the powder of modified cellulose fibers obtained from the following formula:

Residual Portion, % by mass=[(Mass of the powder of modified cellulose fibers when heated at 105° C. for 60 minutes)/(Mass of the powder of modified cellulose fibers before heating)]×100 is 50% by mass or more.

3. The powder of modified cellulose fibers according to claim 1, wherein the amount of anionic groups in the anionically modified cellulose fibers is 0.2 mmol/g or more.

4. The powder of modified cellulose fibers according to claim 1, wherein the anionic group in the anionically modified cellulose fibers is a carboxy group.

5. The powder of modified cellulose fibers according to claim 1, wherein the binding form of the anionic group and the modifying group in the modified cellulose fibers is an ionic bonding and/or a covalent bonding.

6. The powder of modified cellulose fibers according to claim 1, wherein the anionically modified cellulose fibers are derived from oxidation of TEMPO.

7. The powder of modified cellulose fibers according to claim 1, wherein the powder of modified cellulose fibers has an average fiber length of 10 μm or more and 300 μm or less.

8. The powder of modified cellulose fibers according to claim 1, wherein the powder of modified cellulose fibers has an average fiber diameter of 1 μm or more and 100 μm or less.

9. The powder of modified cellulose fibers according to claim 1, wherein the modifying species for introducing a modifying group is a metal inorganic base compound, a primary amine, a secondary amine, a tertiary amine, or a phosphonium compound.

10. The powder of modified cellulose fibers according to claim 1, wherein the water content is 15% by mass or less.

11. The powder of modified cellulose fibers according to claim 1, wherein the water content is 5% by mass or less.

12. The powder of modified cellulose fibers according to claim 1, wherein water is not substantially contained therein.

13. A dispersion comprising a powder of modified cellulose fibers as defined in claim 1 and a medium, wherein the powder of modified cellulose fibers is dispersed in the medium.

14. The dispersion according to claim 13, wherein the medium is one or more members selected from the group consisting of water, N,N-dimethylformamide (DMF), ethanol, isopropanol (IPA), methyl ethyl ketone (MEK), ethyl acetate, toluene, acetone, and cyclohexanone.

15. A resin composition comprising a powder of modified cellulose fibers as defined in claim 1 and a resin, wherein the powder of modified cellulose fibers and the resin are blended.

16. The resin composition according to claim 15, wherein the resin is one or more members selected from the group consisting of thermoplastic resins, curable resins, cellulosic resins, and elastomeric resins.

17. A resin molded article obtained by molding a resin composition as defined in claim 15.

\* \* \* \* \*